United States Patent
Dohle et al.

(10) Patent No.: US 7,459,229 B2
(45) Date of Patent: Dec. 2, 2008

(54) REACTANT SEALING FOR FUEL CELL STACK

(75) Inventors: Hendrik Dohle, Stolberg-Mausbach (DE); Thomas Bewer, Aachen (DE)

(73) Assignee: Forschungszentrum Julich GmbH, Julich (DE)

( * ) Notice: Subject to any disclaimer, the term of this patent is extended or adjusted under 35 U.S.C. 154(b) by 223 days.

(21) Appl. No.: 10/344,681

(22) PCT Filed: Jul. 21, 2001

(86) PCT No.: PCT/DE01/02829

§ 371 (c)(1),
(2), (4) Date: Feb. 13, 2003

(87) PCT Pub. No.: WO02/17417

PCT Pub. Date: Feb. 28, 2002

(65) Prior Publication Data

US 2003/0175574 A1    Sep. 18, 2003

(30) Foreign Application Priority Data

Aug. 19, 2000  (DE) ................................. 100 40 654

(51) Int. Cl.
H01M 2/08    (2006.01)
(52) U.S. Cl. .......................................... 429/35; 429/38
(58) Field of Classification Search ............... 429/12–46
See application file for complete search history.

(56) References Cited

U.S. PATENT DOCUMENTS 3,278,336 A * 10/1966 Uline et al. .................... 429/35
3,902,916 A * 9/1975 Warszawski .................. 429/39
5,116,696 A    5/1992 Barp

FOREIGN PATENT DOCUMENTS

JP         07153480      6/1995
WO       WO99/53559    10/1999

* cited by examiner

Primary Examiner—Patrick Ryan
Assistant Examiner—Keith Walker
(74) Attorney, Agent, or Firm—Andrew Wilford

(57) ABSTRACT

The invention relates to a fuel cell stack in which, according to the invention, several elements of the fuel cell stack are advantageously sealed by a seal in order to form a continuous operating material channel. The inventive fuel cell stack can be provided with a very compact design, whereby the layer thickness of an individual fuel cell is, on a regular basis, distinctly less than 1.5 mm and, advantageously, even less than 1.2 mm.

12 Claims, 6 Drawing Sheets

REACTANT SEALING FOR FUEL CELL STACK

CROSS REFERENCE TO RELATED APPLICATIONS

This application is a national stage of PCT/DE01/02829 filed 21 Jul. 2001 and based upon German national application 100 40 654.8 filed 19 Aug. 2000 under the International Convention.

TECHNICAL FIELD

The invention relates to a fuel cell stack, especially for low-temperature fuel cells.

STATE OF THE ART

A fuel cell has a cathode, an electrolyte, and an anode. The cathode is supplied with an oxidizing medium, for example, air, and the anode is supplied with a fuel, for example, hydrogen.

Different fuel cell types are known. For example, mention can be made of the SOFC fuel cell of the publication DE 44 30 958 C1 and the PEM fuel cell of the publication DE 195 31 852 C1.

A plurality of fuel cells are, as a rule, electrically and mechanically connected together in order to produce greater electrical powers by connecting elements. An example of such a connecting element is the bipolar plate which is known from DE 44 10 711 C1. By means of bipolar plates, fuel cells stacked one above another are connected electrically in series. This arrangement is termed a fuel cell stack.

By providing common anode and cathode compartments for respective pairs of fuel cells, the space required for a fuel cell stack can be significantly reduced by comparison with the individual fuel cells.

Advantageously, for this purpose, in a fuel cell stack, two cells will have a common cell frame, i.e. will be inserted pairwise in each cell frame. A plurality of cell frames connected in succession, which can be contacted externally, then form a fuel cell stack.

Up to now, for the cell frames and also the bipolar plates, expensive structures have actually been required and have been complicated to fabricate and have a certain minimum structural height. Aside from the electrical contacting, one must be concerned with the respective feed and discharge of the operating media.

From WO 98/13891, a bipolar plate for a fuel cell is described which is comprised substantially of a number of planar components. Disadvantageously, this bipolar plate requires sealing between the individual components. They form a layer system with a thickness of about 3 mm.

It has also been found to be a drawback with this configuration that both the anode and cathode components and also the passages through which the operating substances must pass, must be sealed. Because of the compact configuration of the fuel cell stack, the seals which are typically used are flat seals which mandate high requirements for the surfaces of the components as to roughness and finishing precision and thus usually give rise to higher fabrication costs.

OBJECT OF THE INVENTION

The object of the invention is to provide a fuel cell stack which enables a compact construction and does not have the above mentioned drawbacks.

SUMMARY OF THE INVENTION

The object of the invention is achieved with a fuel cell stack comprising at least three neighboring elements (E) which, in order to form a throughgoing passage, each have a through opening. According to the invention:

the through openings ($\phi_a$) of the two outer lying elements ($E_a$) are smaller in diameter than the through opening ($\phi_i$) of the inner lying element, or smaller in diameter than the through openings of the inner lying elements ($E_i$), and only one seal (D) for sealing the passage formed is provided between the outwardly lying elements ($E_a$).

The through openings of the outwardly lying elements can have diameters of the same size. The through openings of the inwardly lying elements can have diameters of the same size. The layer thickness of an individual fuel cell unit can be less than 2 mm, especially less than 1.5 mm. An O-ring can form the aforementioned seal. Each element can have at least two through openings for forming a continuous passage, especially one for fuel and one for the oxidizing medium.

In an embodiment with a flat seal and four elements with gas distributor structures for operating medium distribution as the neighboring elements can be provided. One element can have an additional through opening for electrically contacting of the two neighboring elements. A nonconductive porous fabric or a mesh can form the inwardly lying element ($E_i$).

The fuel cell stack thus encompasses at least three neighboring elements which, to form a throughgoing channel, each have a through passage. Furthermore, the through passages of the elements lying at the outer sides are smaller than the passage of the inwardly lying element or elements. For sealing the channel formed between the outwardly lying element, only one seal is provided.

As elements in the sense of this invention, especially frame elements with gas distributor structures or for receiving a membrane electrode arrangement, bipolar plates or a flat seal should be understood which through corresponding cutouts can serve as an electrode compartment. These elements are typically arranged in neighboring relationship, i.e. layer-like adjacent one another in a fuel cell stack. To form a throughgoing channel in the elements, especially for supply and/or discharge of an operating medium, these elements have corresponding through passages. According to the invention, the passage of the inwardly lying element or the inwardly lying middle element is greater than those of the two outwardly lying elements. The channel formed by the passages of the elements is sealed by a single seal. This seal, according to the invention, lies only between the outwardly lying elements. The passages of the intermediate elements (inwardly lying) have a diameter which is sufficiently greater than the seal between the outwardly lying elements is located within the passage of the intermediate elements. A sealing between the inwardly lying elements with respect to their two neighboring elements can thus be advantageously omitted.

This arrangement has the effect, by contrast with the earlier state of the art, that in the regions of the passage of each individual element to its neighboring element which formally required sealing, a seal can be avoided. As a result, the fuel cell stack is advantageously correspondingly constructed in a more compact manner. The requisite layer thickness of a single fuel cell and thus of the total fuel cell stack can be reduced as a rule.

For more than three elements, there is a saving not only of one, but of a correspondingly larger number of additional seals. The advantageous reduction in the layer thickness for an individual fuel cell grows with each seal which is saved.

In an advantageous embodiment of the invention, the outwardly lying elements have passages with the same diameter. These passages usually form a part of a channel for the operating media. These can advantageously have a single diameter so that flow changes and pressure changes because of different geometries can be avoided.

Advantageously, also all of the inwardly lying elements can have identical diameters for their passages. These passages should be selected to be so large that a seal inserted between the outwardly lying elements can be so dimensioned that its inner diameter corresponds with that of the outwardly lying elements. This advantageously results in a substantially frictionless transition of sealing to breakthrough within the passage for the operating media.

Advantageously, the layer thickness of a fuel cell unit of the fuel cell stack according to the invention has only a layer thickness of less than 2 mm, especially less than 1.5 mm. The layer thickness means, in the framework of the invention for a fuel cell unit, the structural distance from one membrane electrode arrangement (MEA) to the next. In the case of serial fuel cells disposed in cascade, one fuel cell unit is comprised of a membrane, a cathode, the cathode compartment, a bipolar plate, the anode compartment and the anode. In the case of fuel cells in which two identical electrodes respectively are disposed in adjoining relationship, a unit is comprised, for example, of a membrane, a cathode, the cathode space and yet another cathode.

Advantageously, as the seal in a fuel cell stack according to the invention, a circular seal in the form of an O-ring is used. An O-ring does not have as high requirements with respect to surface properties as a flat seal and is easy to handle. A suitable material for an O-ring seal is, for example, EPDM, which is very resistant. In general, O-ring seals are highly elastic seals. In addition, they are cost effective. An O-ring seal need not be made as flat as a flat seal but because of the cost saving for seals, this drawback is more than compensated. Thus it is for example usually possible with the aid of one O-ring as the seal to realize layer thicknesses for a fuel cell unit of less than 2 mm, especially less than 1.5 mm.

The layer thickness can be reduced especially effectively when in a fuel cell stack as many of the operating medium passages as possible can be sealed. Advantageously a fuel cell stack should have elements with at least two and advantageously however, four passages for the formation of operating medium passages. They can be arranged diagonally in an element to achieve an optimum distribution of the operating medium in the electrode compartment.

Additional passages in several elements, especially the flat seals give rise advantageously to a simple electrical contacting between two non-directly neighboring elements. The contact between these elements is effected not externally of the elements but through suitable means directly between them. One such suitable means is a conductive lug which can be swung out of the plane of a first element. Through the corresponding passage in the neighboring second element, there is no contact with this element. Only the further, third element, which has no passage at the corresponding location is contacted by the lug so that in a simple way an electrical connection between the first and third elements but not, however, to the intermediate element, can be made.

BRIEF DESCRIPTION OF THE DRAWING

In the following, the invention is described in greater detail based upon the accompanying drawings without limiting the subject matter of the invention thereby. In the drawing.

SPECIFIC DESCRIPTION

Figure 1A:
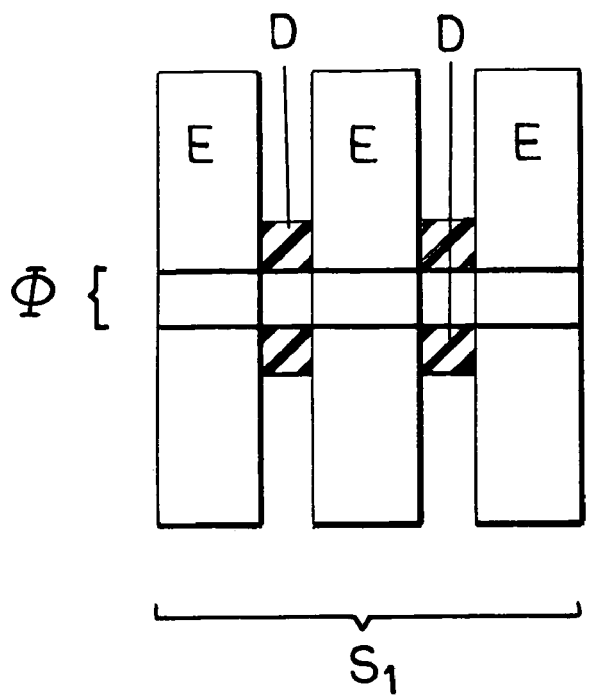
FIG. 1a is schematic cross section of three neighboring elements separated by seals according to the state of the art which have a common throughgoing passage.

FIG. 1a shows schematically a segment from a fuel cell stack according to the state of the art which is comprised of three elements E, for example, frame elements or bipolar plates. These elements each have a throughgoing hole with a diameter $\phi$ which are aligned and thus form a continuous passage. Each element is sealed for example by a ring-shaped seal D around the throughgoing bore with respect to the neighboring element. Up to now, it has been customary to provide these seals as so-called flat seals which are advantageously very thin but have increased requirements as to the surfaces of the elements with respect to roughness and fabrication precision.

Figure 1B:
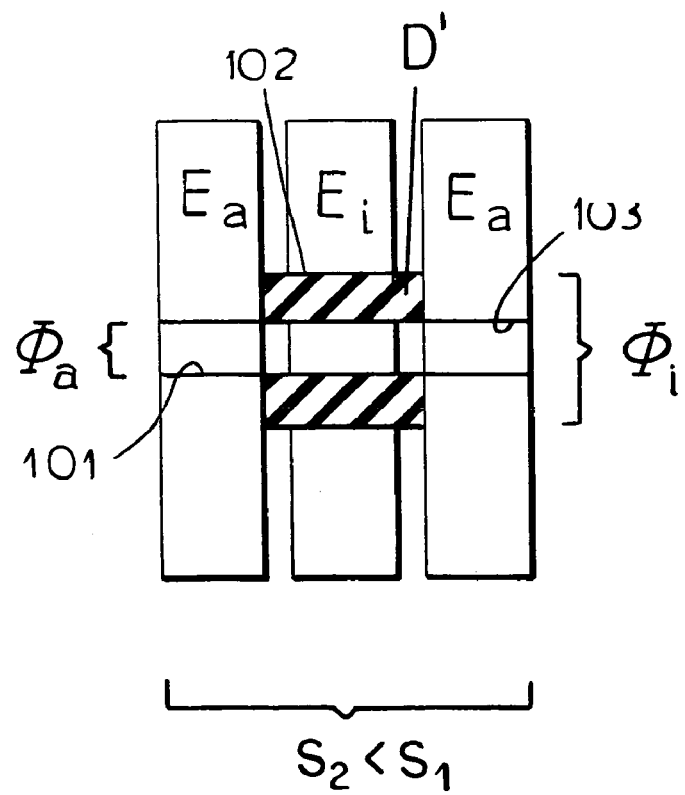
FIG. 1b is a schematic cross section of an embodiment of is the invention with three neighboring elements separated by a single seal and which have a common throughgoing passage.

In FIG. 1b, also shown schematically, is a segment from a fuel cell stack in accordance with an embodiment according to the invention. The three neighboring elements Ea, Ei, Ea, have throughgoing openings 101, 102, 103 for forming a continuous passage. The diameter $\phi_i$ of the throughgoing opening 102 of the inwardly lying element $E_i$ is however greater than the diameter $\phi_a$ of the through openings 101 and 103 of the outwardly lying elements Ea. Thus advantageously a single seal D' can seal the passage between the outwardly lying elements. As shown in FIG. 1b, this seal can have an outer diameter $\phi_i$ and an inner diameter $\phi_a$.

Since in this manner one seal is saved, an expensive flat seal can be eliminated and instead of the latter, for example, a simple O-ring can be provided as the seal. While the single seal D' in FIG. 1b in itself thicker than a flat seal (D in FIG. 1a), in this embodiment of the invention, the layer thickness $S_2$ of the three elements is usually reduced by comparison with the state of the art thickness $S_1$. This provides substantial advantages for the construction of a fuel cell stack according to the invention. The more elements in the fuel cell stack which are connected in the system of the invention by a seal the greater is the saving through the reduction of the layer thickness.

Figure 2:
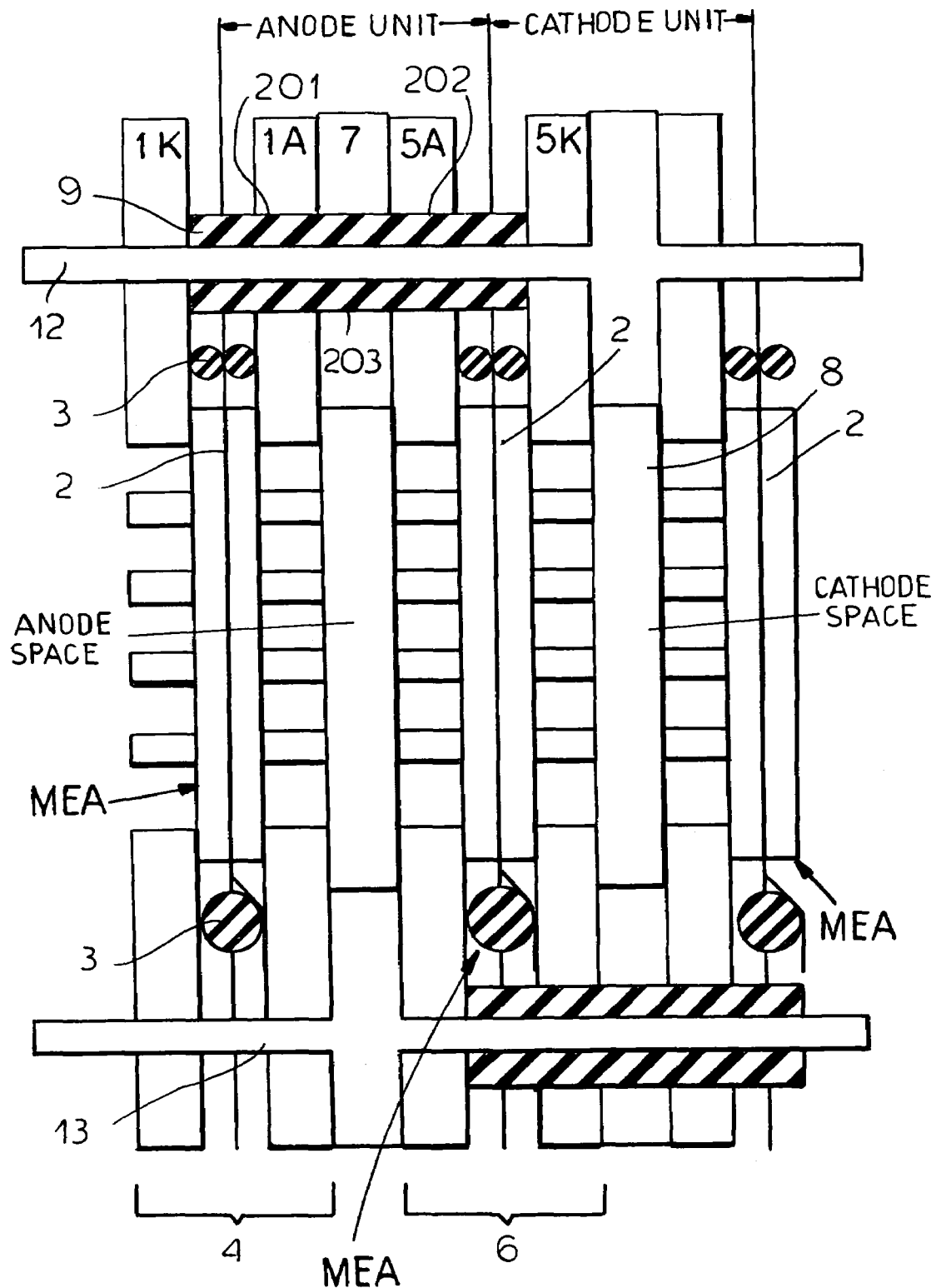
FIG. 2 is a schematic cross-sectional view through a fuel cell stack according to the invention.

FIG. 2 discloses an embodiment of the fuel cell stack according to the invention in which each electrode compartment is bounded by two identical electrodes. An electrode compartment (labeled the anode-space and the cathode-space respectively) is formed by two electrically conductive elements with gas distributor structures 1, 5 and a flat seal 7 disposed between them. Toward the exterior each electrode compartment is bounded by two neighboring membrane-electrode arrangements (MEAs) 2. These are sealed with respect to the neighboring elements and electrically insulated by one seal 3 (top of FIG. 2) or two corresponding seals 3 (bottom of FIG. 2).

The individual elements 1, 5, 7 each have two through openings (see the opening 201, 202 of elements 1A and 5A and opening 203 of element 7) for forming a fuel passage and an oxidizing agent passage. The part of the oxidizing medium passage 12 which runs from the through opening of the element 1K of one cathode unit to the neighboring cathodic element 5K, is only sealed by one seal 9 to the anodic elements 1A, 7 and 5 lying therebetween.

The designation of outwardly lying element and inwardly lying elements should not be seen as absolute but dependent upon the respective passage which they form. With respect to the oxidizing medium element passage, the elements form with the gas distributor structure 5A and 1A, the inwardly lying elements of the anode unit whose through openings, according to the invention, are larger than those of the outwardly elements of the neighboring cathode unit. The same elements 5A, 1A of the anode unit form the fuel medium passage 13.

Figure 3A:
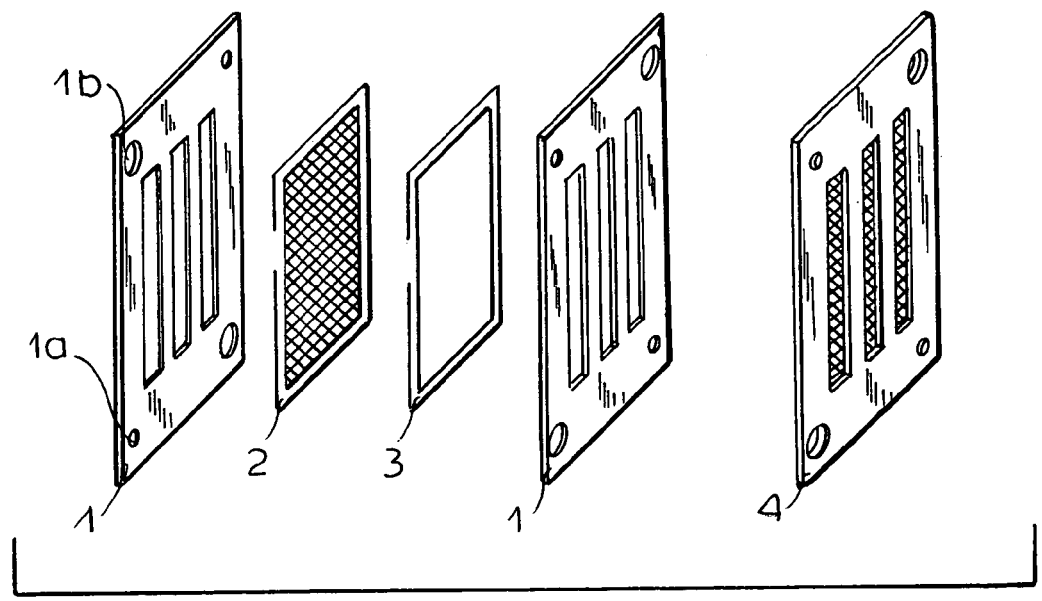
FIG. 3a is an exploded view of a membrane electrode unit with neighboring gas distributor structure for a first embodiment of a fuel cell stack according to the invention.
Figure 3B:
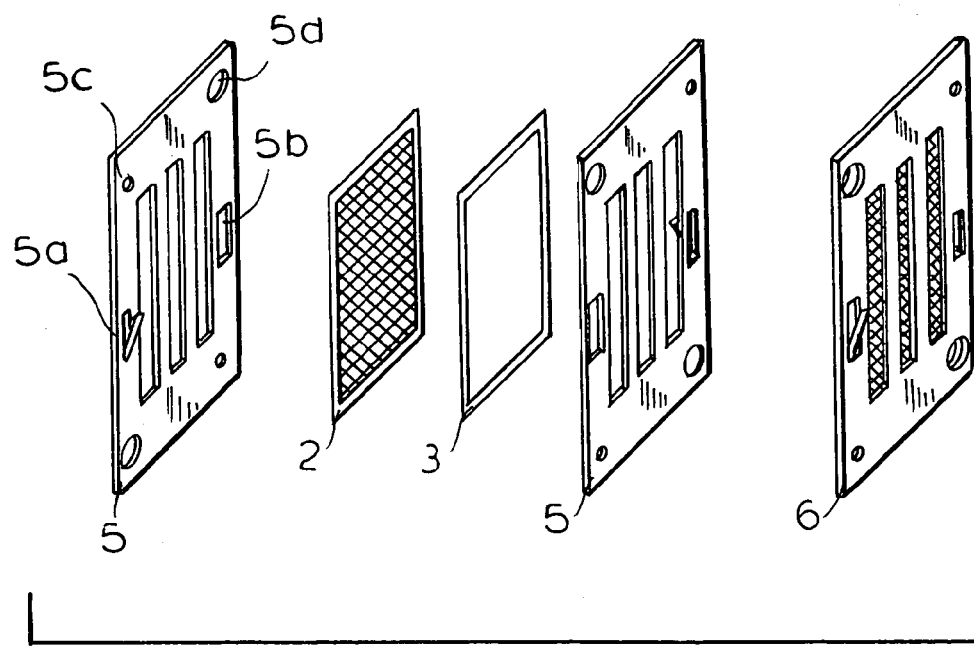
FIG. 3b is an exploded view of a membrane-electrode unit with neighboring gas distributor structure and means for electrical contact for this first embodiment.
Figure 3C:
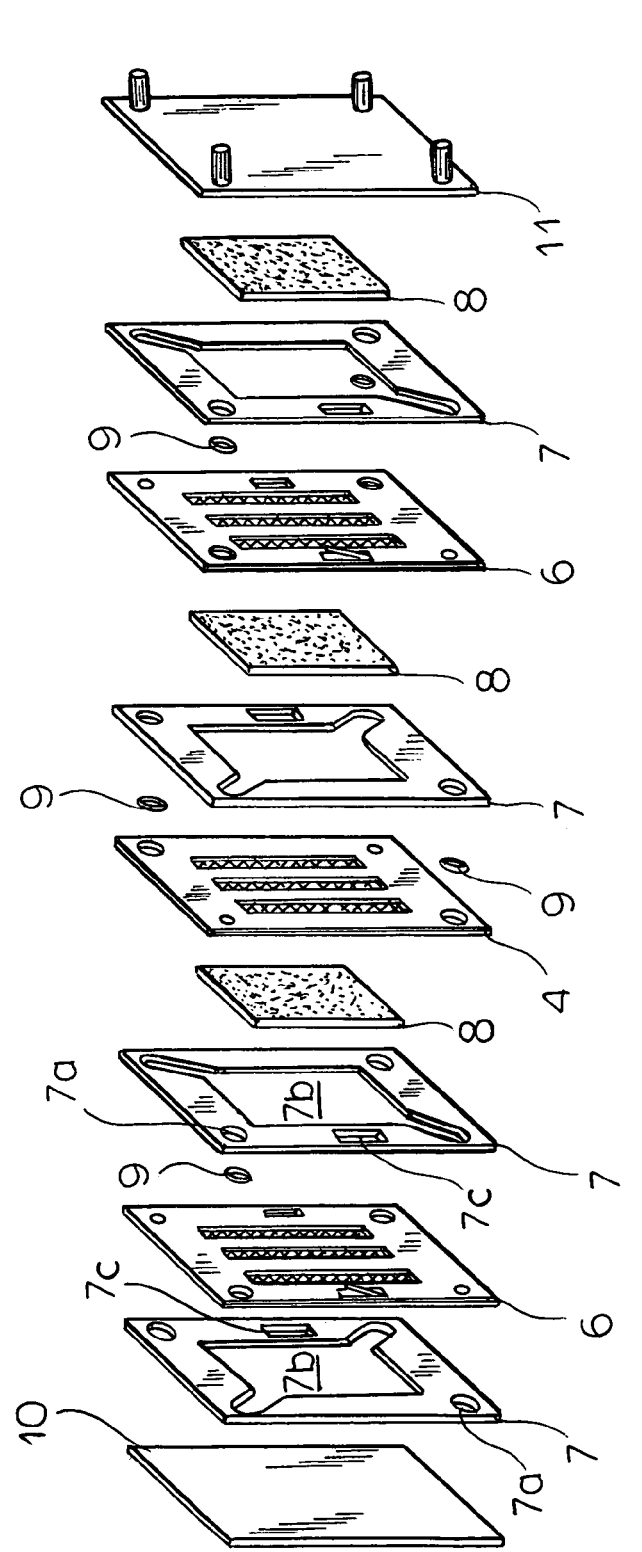
FIG. 3c is an exploded view of the fuel cell stack constructed with units from FIG. 3a and FIG. 3b.

FIGS. 3a through 3c show in a first embodiment the construction of a fuel cell stack according to the invention from individual elements. The membrane-electrode units (MEAs) 2 are premounted in cartridges 4, 6. The electrical insulation of the cartridge plates 1 to 5 is effected over an MEA flat seal 3. The cartridges 4, 6 are so arranged in the stack that each of the two cartridges are in contact over a common anode compartment or cathode compartment. The anode compartment or the cathode compartment between two cartridges 4, 6 or one cartridge 4, 6 and an end plate 10, 11 is formed by a cutout 7b in the flat seal 7. The flow distribution within the medium compartments and the tightening of the MEA can be realized by nonconducting inserts 8.

The insert 8 is a plastic fabric. The cartridge plate 1 and 5 connect via bores 1a, 1b, 5c, 5d into operating medium ducts. The bores 1a, 5c are smaller than the bores 1b, 5d.

The sealing of the medium ducts from, for example, one anode compartment to the next anode compartment are formed by a round sealing ring (O-ring) 9. The surfaces in the cartridge plates 1, 5 which directly surround the smaller bores 1a, 5c are simultaneously abutment surfaces for the sealing ring 9. The sealing ring 9 is received in the space which is formed by the bores 1b, 7a, 5d and 12a. The cartridges 5, for electric current delivery are in contact via contact lugs 5a which, through the breakouts 7c, 5b, 12b in the frame elements 7, engage the cartridge plates 5 and the inserts 12 of the cartridge plates 4 and the end plates 10, 11. The thickness of the cartridge plates 1, 5 amounts to about 0.2 mm, the thicknesses of the frame elements 7 amount to about 0.8 mm and the thicknesses of the inserts 12 are about 0.5 to 4.0 mm.

Figure 4A:
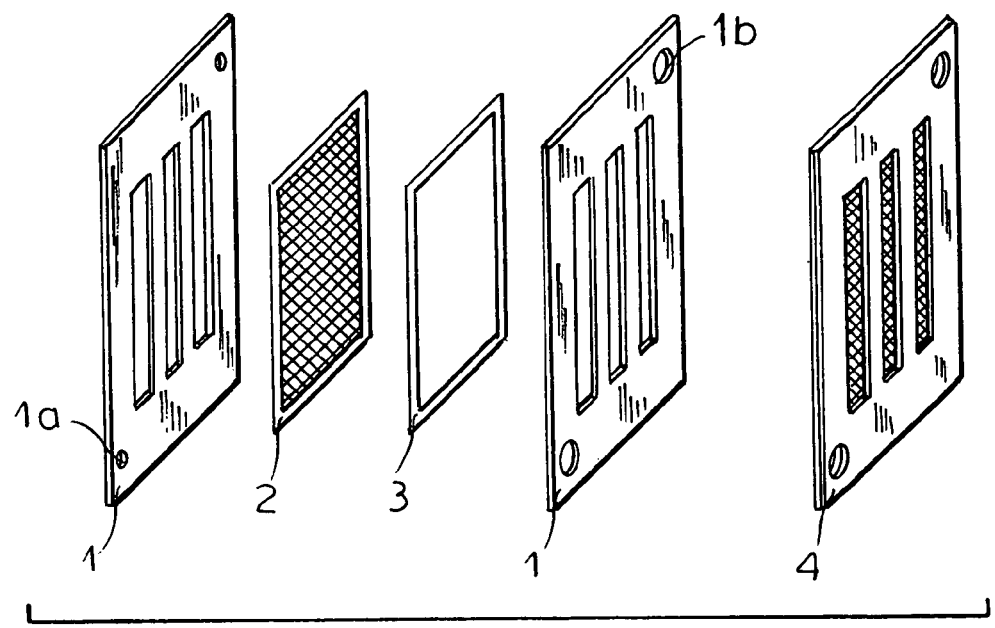
FIG. 4a is an exploded view of a membrane-electrode unit with neighboring gas distributor structure of a second embodiment.
Figure 4B:
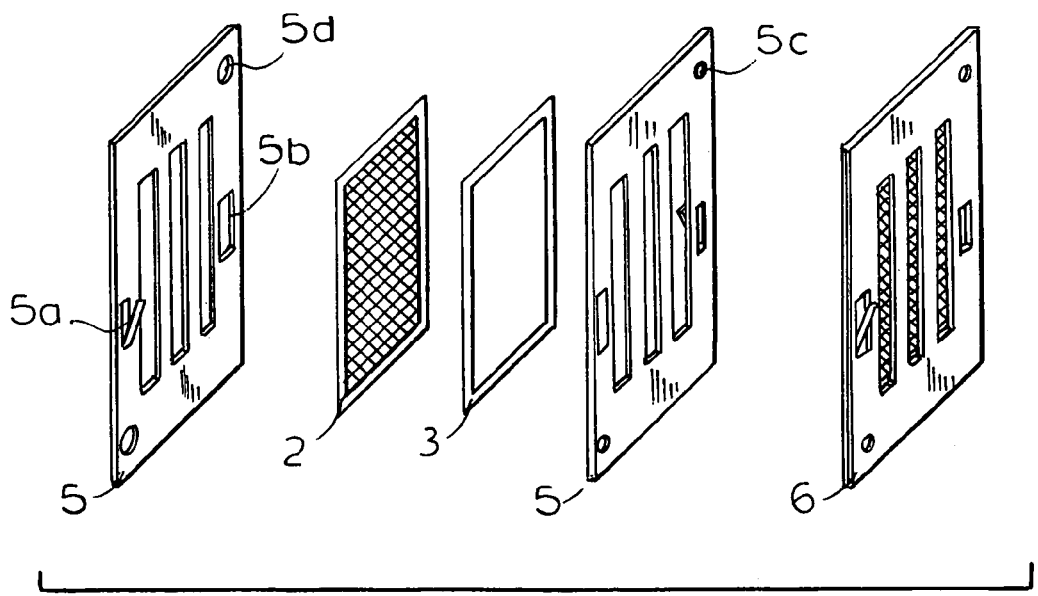
FIG. 4b is an exploded view of a membrane electrode unit with neighboring gas distributor structure and means for electrical contacting of the second embodiment.
Figure 4C:
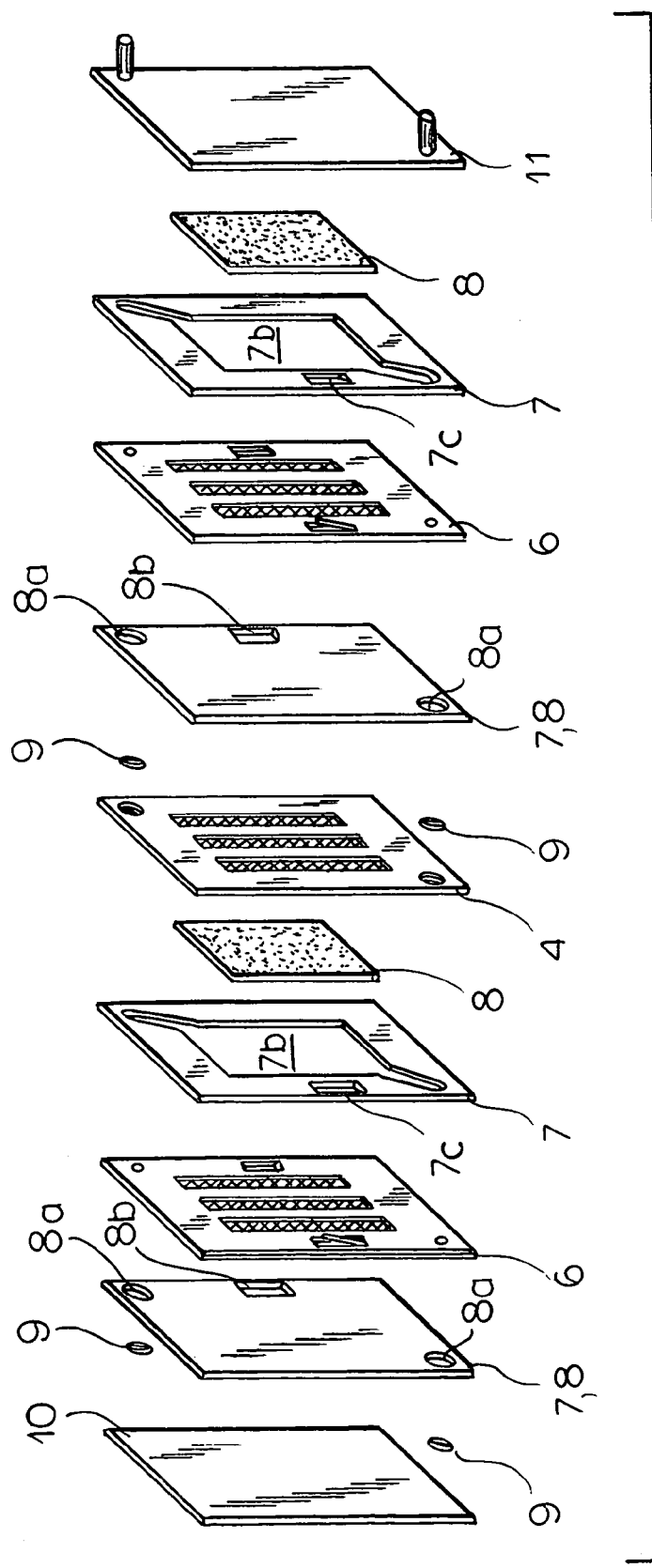
FIG. 4c is an exploded view of a fuel cell stack made with the units from FIG. 4a and FIG. 4b.

FIGS. 4a through 4c show in a second embodiment the construction of a fuel cell stack of the invention from individual elements. In contrast to the fuel cell stack shown in FIG. 3, the individual cartridges 4 and 6 have in this embodiment in their individual elements 1 and 5 only two each of through openings. The through openings for the oxidizing medium passage are omitted. Further, instead of flat seal 7 with inserts provided in the recesses 7b of plastic fabric, partial flat seals 7 are provided which now are completely comprised of the fabric 8 and have through openings for the fuel passage as well as for the lugs 5a.

Instead of a continuous oxidizing agent passage, the oxidizing agent in this embodiment flows directly from the edges of the flat seal 7 into the corresponding cathode compartment. The oxidizing agent is then conducted via blowers onto the fabric 8. For small powers it suffices to provide a fabric 8 of a thickness of 2 to 4 mm without a blower. The extent that the system cannot operate with an oxidizing at ambient pressure, the entire fuel cell unit can also be connected to a larger distribution passage or a collecting passage which is under subatmospheric pressure.

Alternatively, instead of a plastic web for the seal 7 a plastic sheet which has passages or the like set into it can be used.

The invention then has the following advantages:

it is attainable in a very flat construction, less than 1.5 mm per individual cell;

no external wiring is required in spite of common anode and cathode compartments;

the round sealing ring (O-ring) bridges directly four sealing transitions or component surfaces and insures a reliable seal;

it requires significantly fewer components and then only planar components.

The invention claimed is:

1. A fuel cell comprising:
   two juxtaposed outer cathode plates flanking and defining a cathode space;
   two juxtaposed outer anode plates flanking and defining an anode space, the outer plates each being formed offset from the respective space with a throughgoing small-diameter hole and a throughgoing large-diameter hole, the outer plates being stacked with the small-diameter holes of the cathode plates aligned with each other and with the large-diameter holes of the anode plates and with the large-diameter holes of the cathode plates aligned with each other and with the small-diameter holes of the anode plates; and
   respective seals extending through the aligned large diameter holes, one of the seals passing through the cathode space and the other of the seals passing through the anode space, the plates and seals fitting together such that fuel supplied to one of the holes of one of the anode and cathode plates will flow past one of the spaces into the other space and oxidant supplied to the other of the holes of the one of the anode and cathode plates will flow past the other of the spaces into the one space.

2. The fuel cell stack defined in claim 1 wherein each seal is an O-ring.

3. The fuel cell stack defined in claim 1 wherein each seal is a flat seal and the outer plates have gas distributor structures for distribution of the fuel or oxidant to the respective spaces.

4. The fuel cell stack defined in claim 1 wherein one of the outer plates has an additional through opening for electrical contacting of two neighboring inner and outer plates.

5. The fuel cell stack defined in claim 1 wherein each of the inner plates includes
   a frame and
   a nonconductive porous fabric or a mesh in the frame.

6. The fuel cell defined in claim 1 wherein each of the outer plates is formed with two of the large-diameter holes and two of the small-diameter holes.

7. The fuel cell defined in claim 1 wherein the outer plates are rectangularly annular.

8. The fuel cell defined in claim 1, further comprising
an inner cathode plate in the cathode space between the outer cathode plates; and
an inner anode plate in the anode space between the outer anode plates.

9. The fuel cell defined in claim 8, further comprising
end plates flanking the stack of outer plates, one of the end plates being formed with feed ports aligned with the holes of the respective outer plate.

10. The fuel cell defined in claim 8 wherein the outer and inner plates are all rectangularly annular and the inner plates are formed with radially inwardly open notches aligned with the small-diameter holes of the respective outer plates, whereby fluid can flow inward through the notches from the small-diameter holes.

11. The fuel cell stack defined in claim 8 wherein a layer thickness of an individual fuel cell formed by two outer plates and the respective inner plate is less than 2 mm.

12. The fuel cell stack defined in claim 11 wherein the layer thickness is less than 1.5 mm.

\* \* \* \* \*